United States Patent
Park et al.

(10) Patent No.: US 7,415,292 B2
(45) Date of Patent: Aug. 19, 2008

(54) CHARGING CRADLE FOR SEATING PORTABLE DEVICE BOTH HORIZONTALLY AND VERTICALLY

(75) Inventors: Jun-Sang Park, Anyang-si (KR); In-Gon Park, Seoul (KR); Chang-Soo Lee, Incheon (KR)

(73) Assignee: Samsung Electronics Co., Ltd. (KR)

( * ) Notice: Subject to any disclaimer, the term of this patent is extended or adjusted under 35 U.S.C. 154(b) by 460 days.

(21) Appl. No.: 11/273,154

(22) Filed: Nov. 14, 2005

(65) Prior Publication Data

US 2006/0121953 A1 Jun. 8, 2006

(30) Foreign Application Priority Data

Dec. 6, 2004 (KR) .................. 10-2004-0101817

(51) Int. Cl.
*H04M 1/38* (2006.01)
(52) U.S. Cl. .................. 455/573; 455/575.1; 455/90.3; 455/128; 379/13; 379/330
(58) Field of Classification Search ............. 455/573, 455/575.1, 90.3, 128, 347; 379/13, 330, 379/428.01
See application file for complete search history.

(56) References Cited

U.S. PATENT DOCUMENTS

| | | | | |
|---|---|---|---|---|
| 3,598,931 A | * | 8/1971 | Foote | 379/445 |
| 3,601,559 A | * | 8/1971 | Hineline | 379/423 |
| 5,010,565 A | * | 4/1991 | Nash et al. | 455/74.1 |
| 5,263,875 A | * | 11/1993 | Spicer et al. | 439/367 |
| 5,371,784 A | * | 12/1994 | Yankura | 455/573 |
| 5,828,966 A | * | 10/1998 | Davis et al. | 455/573 |
| 5,901,367 A | * | 5/1999 | Toh | 455/575.7 |
| 5,953,656 A | * | 9/1999 | Bertocci | 455/412.2 |
| 6,043,781 A | * | 3/2000 | Toh et al. | 343/702 |
| 6,255,800 B1 | * | 7/2001 | Bork | 320/115 |
| 6,438,229 B1 | * | 8/2002 | Overy et al. | 379/446 |
| 6,796,500 B1 | * | 9/2004 | Chen | 235/439 |
| 7,048,192 B2 | * | 5/2006 | Schmidt et al. | 235/462.43 |
| 7,068,508 B2 | * | 6/2006 | Patel et al. | 361/699 |
| 7,111,786 B2 | * | 9/2006 | Schmidt et al. | 235/462.45 |
| 7,313,423 B2 | * | 12/2007 | Griffin et al. | 455/575.2 |
| 2002/0135977 A1 | * | 9/2002 | Yin et al. | 361/686 |
| 2003/0125075 A1 | * | 7/2003 | Klovborg | 455/556 |
| 2006/0238164 A1 | * | 10/2006 | Rosal et al. | 320/115 |
| 2008/0002340 A1 | * | 1/2008 | Chatterjee et al. | 361/679 |

\* cited by examiner

*Primary Examiner*—Matthew Anderson
*Assistant Examiner*—Minh Dao
(74) *Attorney, Agent, or Firm*—The Farrell Law Firm, PC (57) ABSTRACT

Disclosed is a charging cradle for seating a portable device both horizontally and vertically. The charging cradle for a portable device includes a cradle body, a support body supporting the cradle body on a rear side of the cradle body, a first slot defined and surrounded by an inner wall of the cradle body, so as to seat the portable device therein in such a manner that the portable device can stand in a vertical direction of the cradle body, and a second slot formed before the first slot and extending in a horizontal direction of the cradle body, so as to seat the portable device therein in such a manner that the portable device can be placed in the horizontal direction.

10 Claims, 7 Drawing Sheets

CHARGING CRADLE FOR SEATING PORTABLE DEVICE BOTH HORIZONTALLY AND VERTICALLY

PRIORITY

This application claims priority to an application entitled "Charging Cradle For Seating Portable Device Both Longitudinally And Transversely" filed with the Korean Intellectual Property Office on Dec. 6, 2004 and assigned Serial No. 2004-101817, the contents of which are incorporated herein by reference.

BACKGROUND OF THE INVENTION

1. Field of the Invention

The present invention relates to a charging cradle for a digital communication device including a cellular phone, a PDA (Personal Digital Assistants), an HHP (Hand Held Phone), a camera phone, a game phone, etc., and more particularly to a charging cradle for seating a portable device both horizontally and vertically.

2. Description of the Related Art

In general, a "portable communication device" refers to an electronic device that a user can carry to perform wireless communication. To facilitate portability, designs of such portable communication devices tend not only to be compact, slim, and light, but are also moving toward providing multimedia availability, having a wider variety of functions. In particular, future portable communication devices are expected to incorporate greater multi-functionality and be capable of multi-purpose utilization, as well as being more compact, light, and capable of being modified to be suitable for various multimedia or Internet environments.

Portable communication devices may be classified into various categories according to their appearance, such as a bar-type portable communication device, a flip-type portable communication device, and a folder-type portable communication device. Portable communication devices may also be classified into necklace type and bracelet type portable communication devices according to the position or the way in which users put on the portable communication devices. In addition, portable communication devices may be classified into a rotation-type portable communication device and a slide-type communication device according to the manner of opening and closing the portable communication device. These variously classified portable communication devices can be easily understood by those skilled in the art.

Meanwhile, conventional portable communication devices now are able to transmit data at high speed in addition to performing the basic voice communication function. In other words, according to the increase in consumer demand, portable communication devices now provide a service using a wireless communication technology capable of transmitting data at high speed.

Recent portable communication devices also tend to be equipped with a camera lens to obtain video signals for transmission. In other words, current portable communication devices have an external or embedded camera lens module which enables users to perform video communication with desired partners or to photograph desired subjects.

All the conventional portable communication devices include a power supply device called a battery pack to supply electric power, and after the power of the battery pack is consumed, the battery pack is recharged by seating it in a charging cradle.

However, the charging cradle for recharging the battery pack of the conventional portable communication device has a structure in which the body of the device is seated in a slot of the charging cradle only horizontally, and a display unit of the device is disposed along the horizontal direction of the body. Therefore, there is a problem in that a screen displayed on the display unit of the body seated in the charging cradle is small. Further, in the case where a separate vertical cradle is provided, it is not preferable from the standpoint of economy.

Further, it is well known that a user has an instinct by which the user wants to watch the displayed screen with a wider width.

SUMMARY OF THE INVENTION

Accordingly, the present invention has been made to solve at least the above-mentioned problems occurring in the prior art, and an object of the present invention is to provide a charging cradle in which a portable device can be seated vertically or horizontally.

Another object of the present invention is to provide a charging cradle in which a portable device can be seated horizontally to facilitate watching moving picture mediums through the body's display device.

Another object of the present invention is to maximize the spatial efficiency by using slots in which a portable device can be seated both horizontally and vertically.

In order to accomplish these objects, there is provided a charging cradle of a portable device that includes a cradle body, a support body supporting the cradle body on a rear side of the cradle body, a first slot defined and surrounded by an inner wall of the cradle body, so as to seat the portable device therein in such a manner that the portable device can stand in a vertical direction of the cradle body; and a second slot formed before the first slot and extending in a horizontal direction of the cradle body, so as to seat the portable device therein in such a manner that the portable device can be placed in the horizontal direction, the second slot communicating with the first slot.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
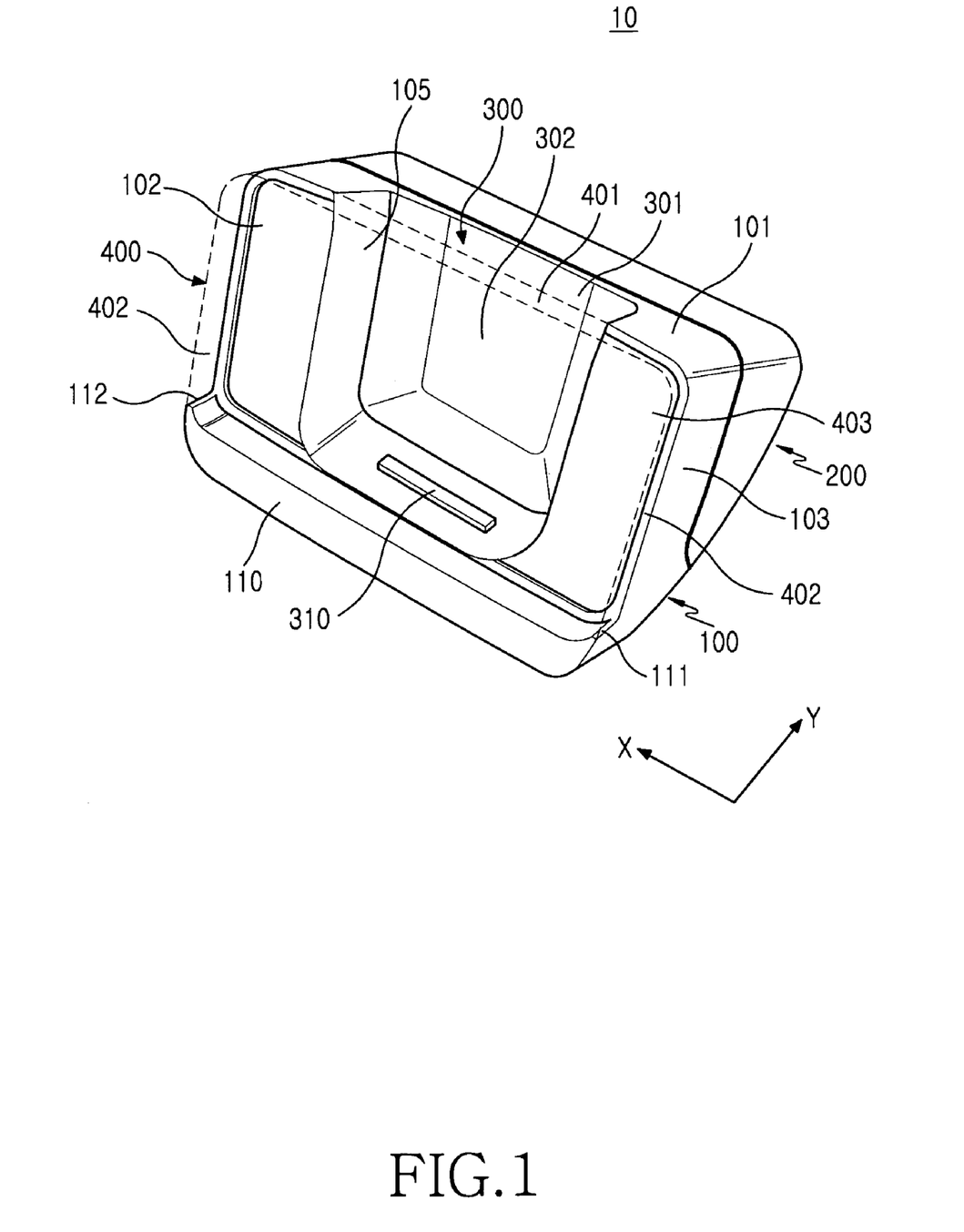
FIG. 1 is a perspective view of a charging cradle according to a preferred embodiment of the present invention.

In FIG. 1, the X-axis direction indicates the horizontal direction, and the Y-axis direction indicates the vertical direction. It should be noted that a charging cradle 10 according to the present invention can seat a portable device in such a manner that the portable device can either stand vertically or be placed horizontally. The charging cradle according to the present invention includes a cradle body 100, a support body 200 supporting the cradle body 100 on the rear side thereof, a first slot 300 provided in the cradle body 100 and recessed by a predetermined depth to seat the portable device vertically standing, and a second slot 400 provided in the cradle body 100 and recessed by a predetermined depth to seat the portable device horizontally. The cradle body 100 has an extending shape, thereby providing stability. The support body 200 supports the cradle body 100 in such a manner that the cradle body is inclined, thereby providing the stability for the portable device and an angle which allows a user to see the portable device conveniently.

The first slot 300 is defined by the inner wall 105 of the cradle body 100 surrounding the first slot 300, so that a predetermined portion of the portable device can be seated in the first slot 300 and surrounded by the inner wall 105. The second slot 400 is located on the front side of the first slot 300 and has a shape with which it extends horizontally. Preferably, the first and second slots 300 and 400 spatially communicate with each other. The cradle body 110 includes a lower support portion 110 for supporting the horizontal placement of the portable device at the lower end thereof. Both ends 111 and 112 of the lower support portion 110 are bent to stably hold the portable device seated in the charging cradle 10.

The first slot 300 includes a connection portion 310. The connection portion 310 functions as a charging terminal when the portable device is vertically seated in the charging cradle 10.

Figure 4A:
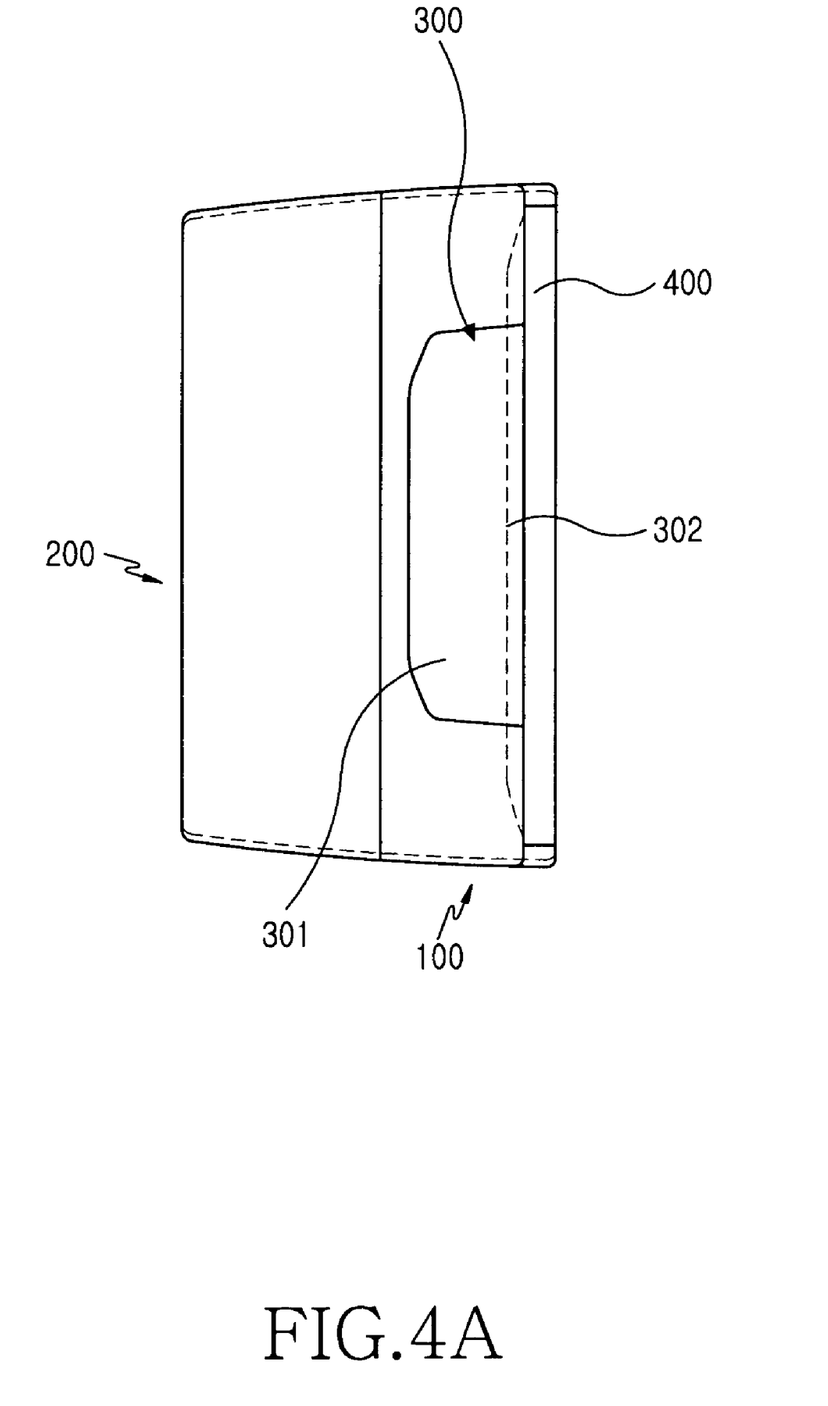
FIG. 4A is a plan view of the charging cradle shown in FIG. 3.
Figure 4B:
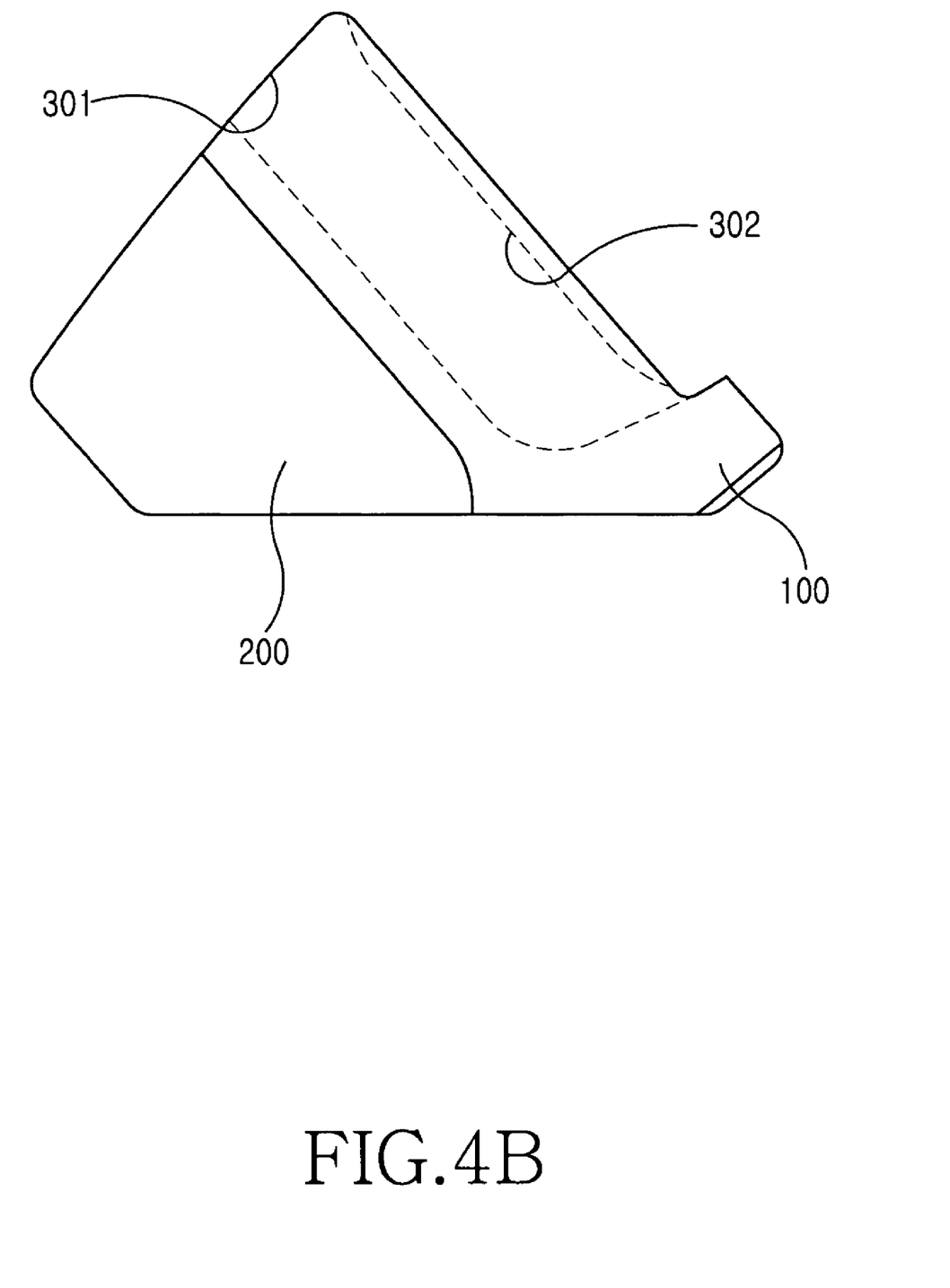
FIG. 4B is a side view of the charging cradle shown in FIG. 3.
Figure 5A:
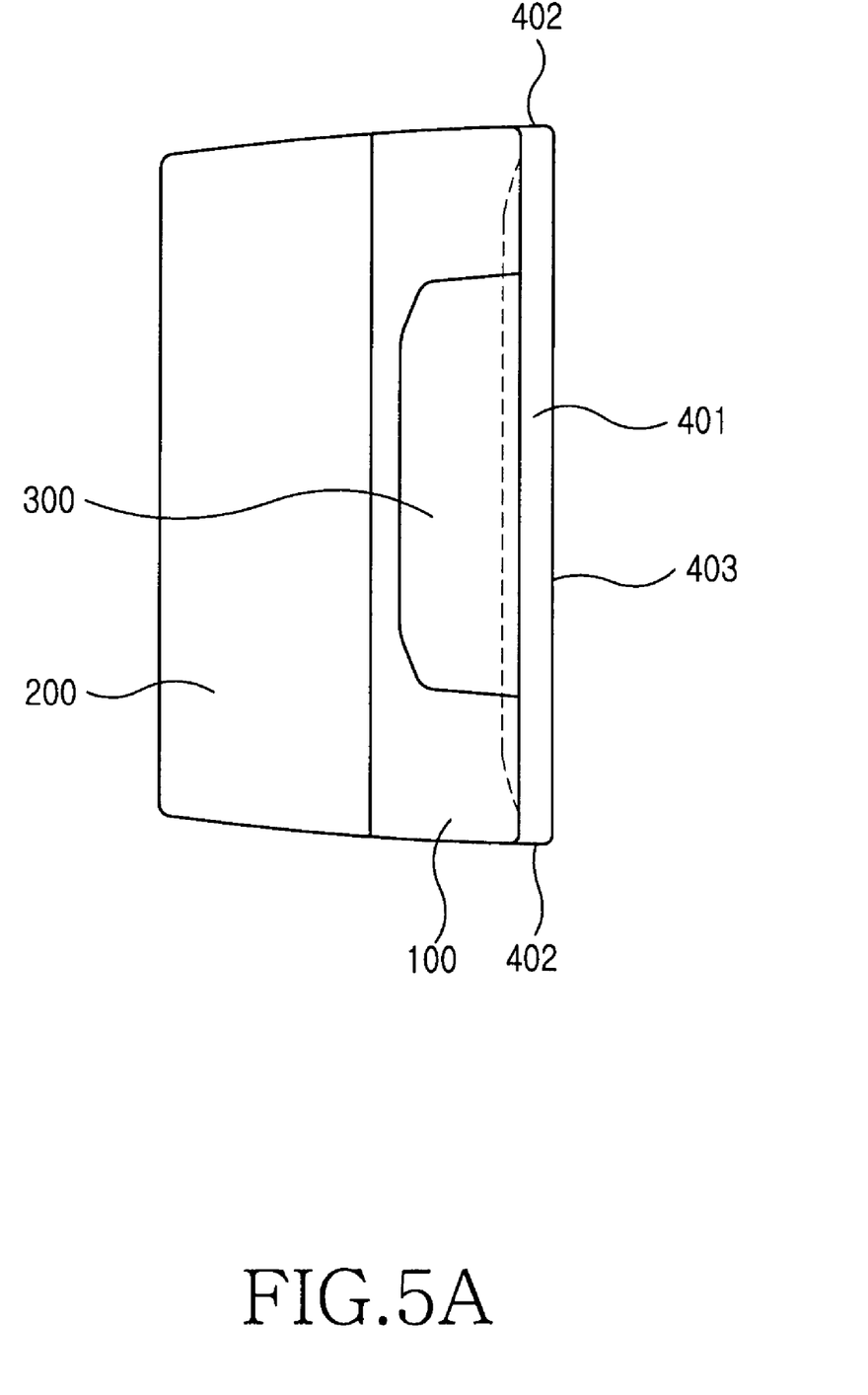
FIG. 5A is a plan view of the charging cradle shown in FIG. 4.
Figure 5B:
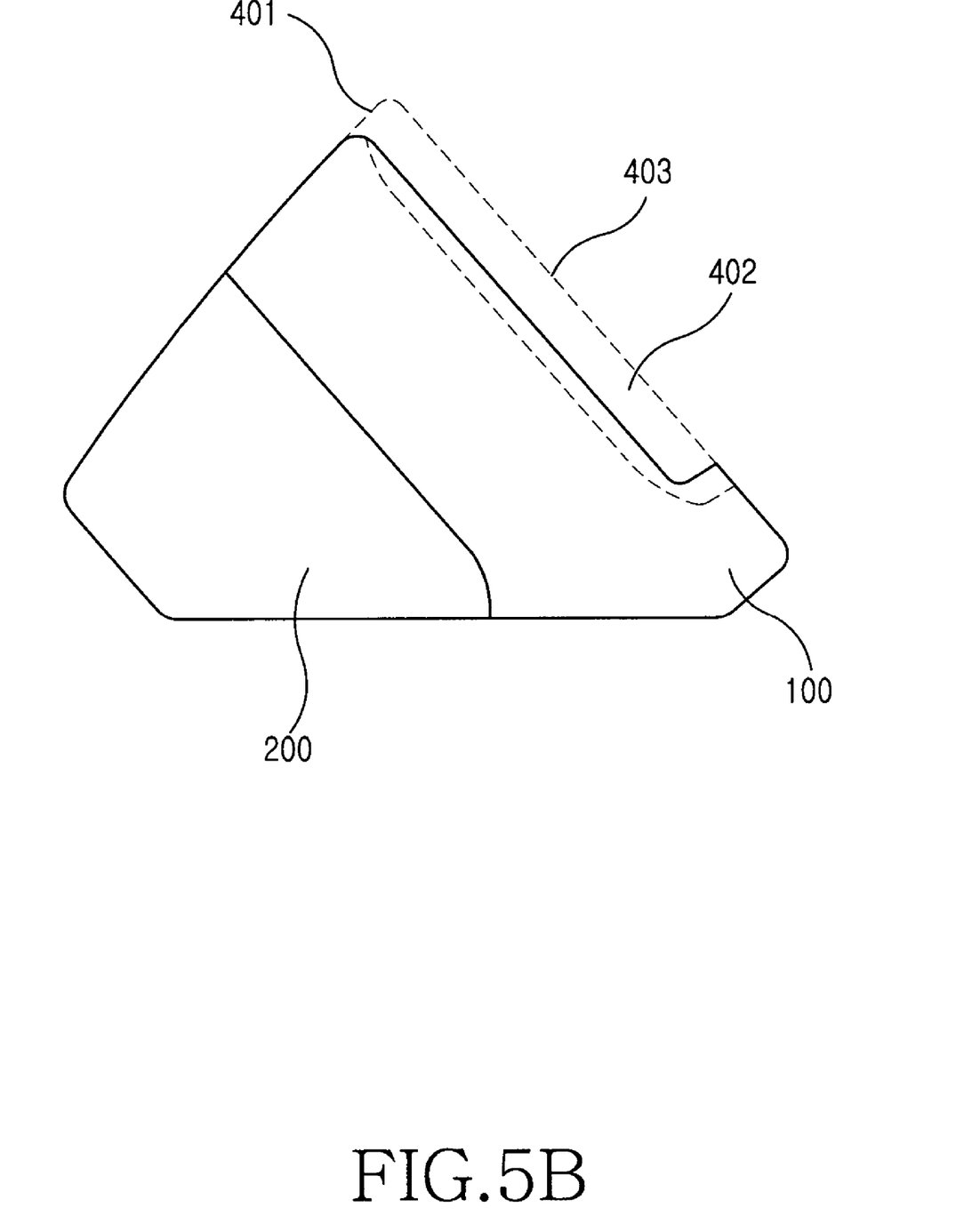
FIG. 5B is a side view of the charging cradle shown in FIG. 4.

As shown in FIGS. 1, 4A, and 5A, the first slot 300 has a first opened end 301 provided on the upper surface 101 of the cradle body 100 and a second opened end 302 provided on the bottom surface 102 of the cradle body 100. Further, the second slot 300 has a third opened end 401 provided on the upper surface of the cradle body 100, fourth opened ends 402 provided on side surfaces 103 of the cradle body 100, and a fifth opened end 403 (refer to FIG. 5b) provided on the front surface of the cradle body 100.

Figure 2:
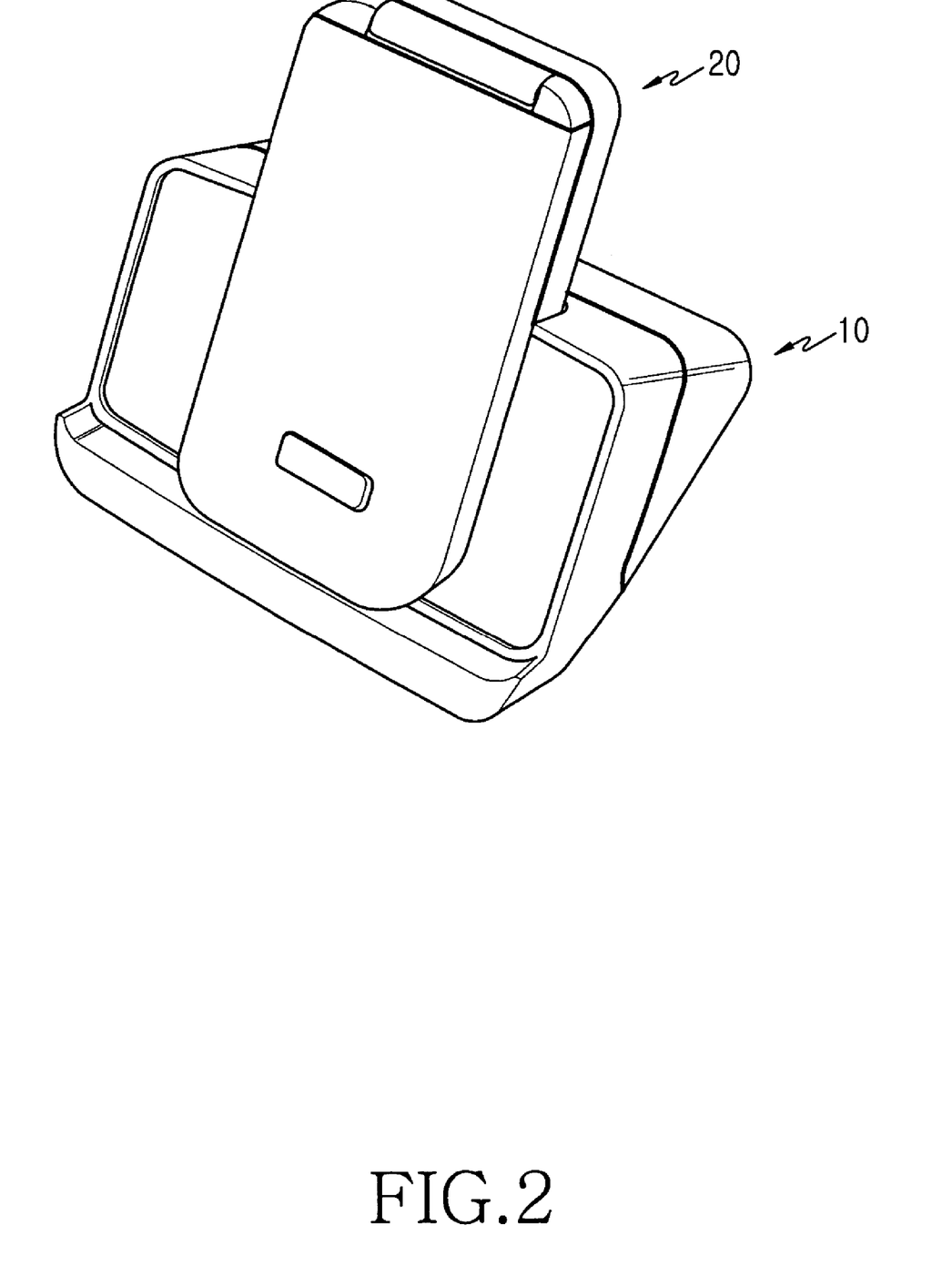
FIG. 2 is a perspective view of the charging cradle of FIG. 1 with a portable device seated vertically in the charging cradle.
Figure 3:
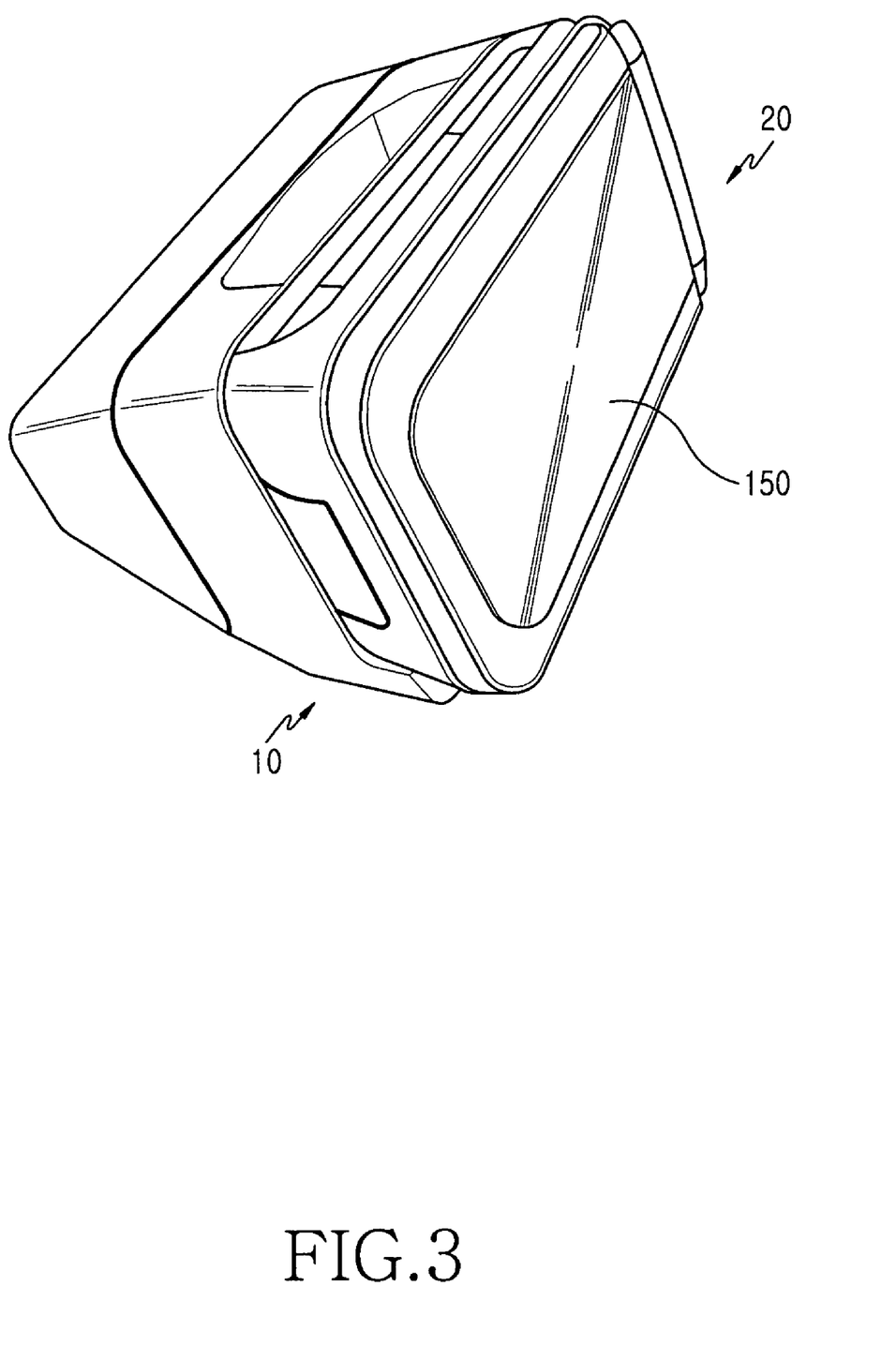
FIG. 3 is a perspective view of the charging cradle of FIG. 1 with a portable device seated horizontally in the charging cradle.

The horizontal and vertical placement states of the charging cradle 10 are shown in FIGS. 2 and 3. As shown in FIG. 2, a spatial area of the second slot 400 is trespassed by the portable device 20 when the portable device 20 is vertically seated in the charging cradle 10. On the other hand, as shown in FIG. 3, the portable device 20 does not trespass the first slot 300 when the portable device 20 is horizontally placed in the charging cradle 10. Here, since the first and second slots 300 and 400 of the charging cradle 10 are communicated with each other and the second slot 400 is partially trespassed by the portable device when the portable device 20 is vertically seated in the charging cradle 10, the sharing area of the first and second slots 300 and 400 enables the charging cradle 10 to have a size smaller than that of a conventional charging cradle in spite that the portable device can be engaged with the charging cradle 10 both horizontally and vertically. Therefore, since the overall size of the discharging cradle 10 is not greater than that of the conventional one and the portable device can be seated in the discharging cradle 10 both horizontally and vertically, the discharging cradle 10 according to the present invention has an advantage in that it is convenient to carry.

In the state of FIG. 2, a user can charge the portable device or talk to a partner by the portable device, with the portable device seated in the charging cradle. Further, in the state of FIG. 3, the user can watch moving picture mediums of an ordered video, a digital TV, etc. by using a display unit 150 of the portable device 20.

As above mentioned, according to the present invention, since the portable device is seated in the charging cradle both horizontally and vertically, moving picture mediums can be conveniently watched. Further, since the charging cradle according to the present invention has an optimum structure (communicating or sharing structure) including the first and second slots, the overall size thereof is not greater than that of the conventional charging cradle and the portable device can be seated in the charging cradle both horizontally and vertically.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A charging cradle for a portable device, comprising:
   a cradle body;
   a support body supporting the cradle body on a rear side of the cradle body;
   a first slot defined and surrounded by an inner wall of the cradle body, so as to seat the portable device therein in such a manner that the portable device can stand in a vertical direction of the cradle body; and
   a second slot formed before the first slot and extending in a horizontal direction of the cradle body, so as to seat the portable device therein in such a manner that the portable device can be placed in the horizontal direction.

2. A charging cradle according to claim 1, wherein the cradle body has a shape to support the portable device in either the horizontal or vertical position.

3. A charging cradle according to claim 1, wherein the support body supports the cradle body in such a manner that the cradle body is inclined.

4. A charging cradle according to claim 1, wherein the cradle body includes a lower support portion for supporting the horizontal placement of the portable device at an lower end thereof.

5. A charging cradle according to claim 4, wherein both ends of the lower support portion are bent to stably hold the portable device seated in the charging cradle.

6. A charging cradle according to claim 1, wherein the first slot has a first opened end provided on an upper surface of the cradle body and a second opened end provided on a bottom surface of the cradle body.

7. A charging cradle according to claim 1, wherein the second slot has a third opened end provided on an upper surface of the cradle body, fourth opened ends provided on side surfaces of the cradle body, and a fifth opened end provided on a front surface of the cradle body.

8. A charging cradle according to claim 1, wherein a spatial area of the second slot is trespassed by the portable device when the portable device is seated in the charging cradle vertically.

9. A charging cradle according to claim 1, wherein the first slot is not trespassed by the portable device when the portable device is seated in the charging cradle horizontally.

10. A charging cradle according to claim 1, wherein the first slot has a connection portion to connect with the portable device when the portable device is seated in the charging cradle vertically.

* * * * *